United States Patent [19]

Oetiker et al.

[11] Patent Number: 5,284,368
[45] Date of Patent: Feb. 8, 1994

[54] CONNECTION FOR FLEXIBLE AND STRETCHABLE TUBES, ESPECIALLY SILICON TUBES

[75] Inventors: Hans Oetiker, Horgen, Switzerland; Emil Badertscher, Marlette, Mich.

[73] Assignee: Hans Oetiker AG Maschinen- und Apparatefabrik, Switzerland

[21] Appl. No.: 735,934

[22] Filed: Jul. 25, 1991

[51] Int. Cl.⁵ .............................................. F16L 33/12
[52] U.S. Cl. .................................. 285/81; 285/255; 285/330
[58] Field of Search ............... 285/242, 245, 244, 255, 285/81, 330, 82, 83, 84, 85

[56] References Cited

U.S. PATENT DOCUMENTS

| | | | |
|---|---|---|---|
| 4,278,279 | 7/1981 | Zimmerman | 285/255 |
| 4,557,508 | 12/1985 | Walker | 285/84 |
| 4,577,894 | 3/1986 | Wake | 285/242 |
| 4,775,173 | 10/1988 | Sauer | 285/242 X |
| 4,923,226 | 5/1990 | Bartholomew | 285/242 |
| 4,946,200 | 8/1990 | Blenkush et al. | 285/255 X |

FOREIGN PATENT DOCUMENTS

| | | | |
|---|---|---|---|
| 535058 | 4/1922 | France | 285/245 |
| 858607 | 1/1961 | United Kingdom | 285/245 |

Primary Examiner—Dave W. Arola
Attorney, Agent, or Firm—Paul M. Craig, Jr.

[57] ABSTRACT

A tube connection consisting of a nipple structure and a sleeve member in which the nipple structure includes a tube-receiving portion provided, starting from an abutment surface with a substantially cylindrical section and an outwardly flaring clamping surface. The sleeve member is provided with a first internal section of substantially cylindrical shape followed in the direction toward the free end of the tube-receiving portion with an outwardly flaring clamping surface, whereby the internal diameter of the cylindrical section of the sleeve member is only slightly larger than the maximum diameter of the tube-receiving nipple portion. In one embodiment, the nipple structure and sleeve member are provided with complementary locking means to enable locking of the sleeve member in the clamping position by axial movement in the direction of the free end of the tube-receiving nipple portion and subsequent rotation of the sleeve member into predetermined locking position. In another embodiment, a separate locking insert is used. In still another embodiment, the tube-receiving nipple portion is provided with two enlarged portions of increasing diametric dimension toward the free end of the nipple portion.

34 Claims, 3 Drawing Sheets

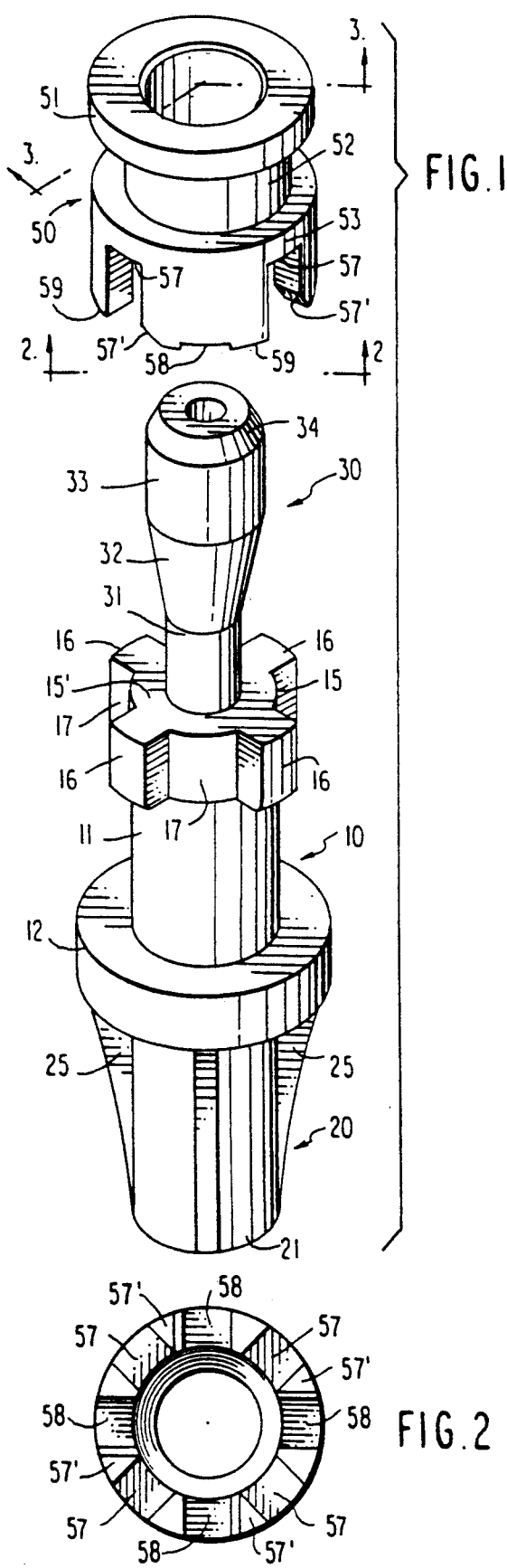
FIG.1
FIG.2
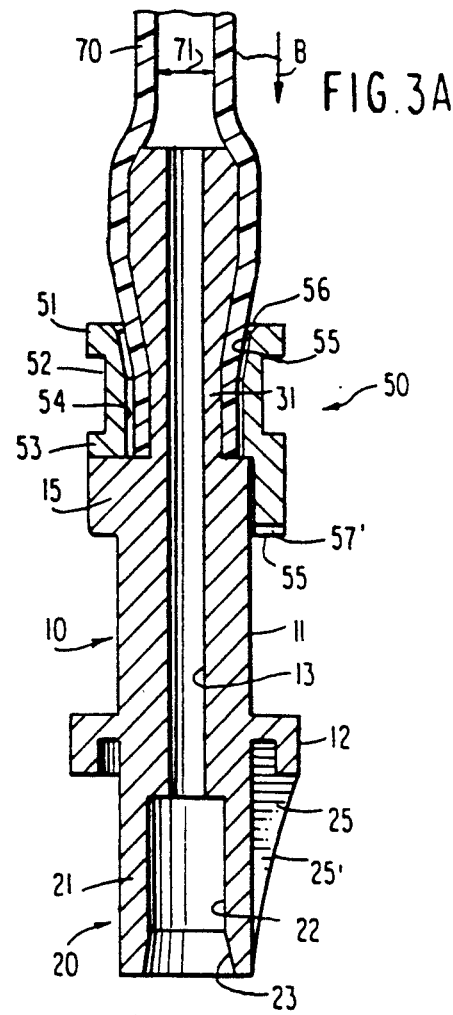
FIG.3A
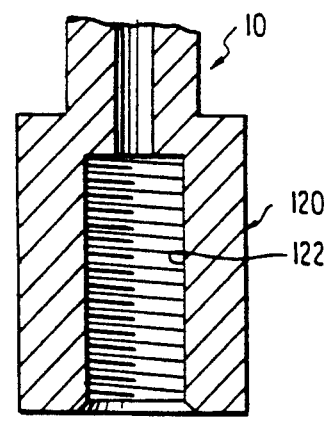
FIG.7

CONNECTION FOR FLEXIBLE AND STRETCHABLE TUBES, ESPECIALLY SILICON TUBES

FIELD OF THE INVENTION

The present invention relates to a connection for connecting flexible and stretchable tubes, and more particularly to a connection for silicon tubes as are used, for example, in intravenous feeding.

BACKGROUND OF THE INVENTION

Connections for hoses and tubes of the most varied type are known in the prior art. Many of these connections utilize clamps which can be tightened in a number of ways. For example, they may be tightened by a plastically deformable, so-called "Oetiker" ear as disclosed in U.S. Pat. Nos. 2,614,304; 2,847,742; 3,082,498 and 4,299,012. Other types of clamps utilize a screw-type tightening mechanism or toggle-type tightening mechanism as disclosed, for example, in U.S. Pat. Nos. 3,475,793 and 4,521,950. Other clamps rely on the threaded engagement between a nipple member and a sleeve surrounding the same, as disclosed, for example, in U.S. Pat. Nos. 2,399,790; 2,865,094 or 3,870,349. However, the prior art clamps are not particularly suitable for flexible, stretchable hoses or tubes, such as silicon tubes which have very smooth, external surfaces and are highly stretchable. Added thereto is the problem of the small size of such tubes as are used for intravenous feeding, particularly in connection with drip chambers. Attempts to fasten such hoses onto nipple structures by means of clamps have not proved successful to date. Coupling devices with clamping surfaces are also known in the prior art, as exemplified by U.S. Pat. Nos. 4,208,067; 4,790,569 and 4,923,226. However, they usually involve double-frusto conical surfaces which require a radial fastening band or the like to hold together and tighten up arcuate sections. Quick disconnect pipe couplings with interlocking action by bayonet-type arrangements involving relative rotation are also known in the prior art, as disclosed, for example, in U.S. Pat. Nos. 699,366 and 3,583,667. However, these devices are, for the most part, complicated in structure and unsuitable as coupling devices for small diameter tubes with great stretchability and flexibility and with slippery outer surfaces. Furthermore, they do not satisfy the requirement for ease of connection and disconnection as required in hospital environments.

SUMMARY OF THE INVENTION

Accordingly, it is a primary object of the present invention to provide a tube connection for relatively small diameter tubes made of highly flexible and stretchable materials, such as silicon tubes, which avoids by simple means the aforementioned shortcomings and drawbacks encountered in the prior art.

Another object of the present invention resides in a tube connection of the type described above which assures reliable holding of the tube onto the nipple structure combined with ease of connection and disconnection of the hose to and from the nipple structure.

A further object of the present invention resides in a tube connection for highly flexible, stretchable tubes of small diametric dimensions with smooth external surfaces which can be manufactured in a relatively inexpensive manner, yet permits ease of handling even by technically relatively untrained personnel.

A further object of the present invention resides in a tube connection of the type described above which utilizes only two parts of simple construction.

The underlying problems are solved according to the present invention in that the tube connection utilizes a nipple structure and a sleeve member of such complementary external, respectively, internal clamping surfaces that a small tube made of highly stretchable and flexible material is securely held in place between the complementary internal and external clamping surfaces as the sleeve member is axially moved from a non-clamping position into its clamping position. The nipple structure thereby preferably includes an annular abutment or collar against which the hose to be clamped fast is placed when being mounted over the tube-receiving nipple portion. The tube-receiving nipple portion thereby includes, going from the annular abutment to the free end thereof, a first, cylindrical nipple section which is adjoined by a second, outwardly flaring nipple section which in turn is followed by a third, cylindrical nipple section of larger diametric dimension than the first, cylindrical nipple section and terminates in a fourth, tapering nipple section ending in a diametric dimension substantially the same or slightly larger than the first, cylindrical nipple section. The sleeve member has a first, cylindrical section with an internal diameter only slightly larger than the external diameter of the third, cylindrical nipple section, which in a direction toward the free end of the tube-receiving nipple portion is adjoined by a second outwardly flaring sleeve section terminating in a relatively short third sleeve section with more pronounced outwardly flaring surfaces forming guide surfaces for the tube. The two outwardly extending tapering or flaring surfaces of the second nipple section and of the second sleeve section thereby form angles with the respective first nipple section and first sleeve section which are the same, thereby assuring parallelism between these two tapering sections. The first, cylindrical nipple section is thereby chosen so as to be at least approximately equal to the internal diameter of the tube. The third nipple section has an external diametric dimension to which the flexible, stretchable tube can be readily expanded as it is slipped over the tube-receiving nipple portion whereby the fourth, tapering portion nipple section assists in expanding the tube. The dimensions are thereby so chosen that the tube can be readily mounted over the tube-receiving nipple portion when the sleeve member is in abutment at the annular collar or abutment because the space defined between the external diametric dimension of the first nipple section and the internal diametric dimension of the first sleeve section as also between the external dimensions of the second nipple section and the internal dimensions of the second sleeve section are such as to readily accommodate the thickness of the tube, whereby the axial lengths of the first nipple section and of the first sleeve member are so chosen that the first sleeve member is slightly shorter than the first nipple section. As the sleeve member is then displaced in the direction toward the free end of the tube-receiving nipple portion, the tube will be clamped fast in the reduced small annular space remaining within the area of the second nipple section near the area where it passes over into the third nipple section, on the one hand, and the first, respectively, second sleeve section, on the other. A bayonet-like locking arrangement between the nipple structure and the sleeve member permits the sleeve member to be locked in the clamping position. In the alternative, the sleeve member may be displaced into and locked in its locking position by a separate insertable locking member which can be wedged into the axial space between the annular abutment or collar and the sleeve member.

According to another embodiment of the present invention, the tube-receiving nipple portion is provided with two axially spaced annular enlarged portions whereby the first annular enlarged portion nearer the annular abutment or collar is of smaller diametric dimension than the second annular enlarged portion nearer the free end of the nipple portion. The cylindrical sleeve member has a substantially cylindrical internal surface over most of its length of such diametric dimension that it can pass over the second annular enlarged portion in the absence of a tube but is prevented from moving over the second annular enlarged portion in the presence of a tube. The sleeve member is thereby provided with an outwardly flaring clamping portion subtending an angle with respect to the axis which is substantially the same as the angle subtended by the outwardly flaring portion connecting the cylindrical nipple section between the two annular enlarged portions with the second enlarged portion.

BRIEF DESCRIPTION OF THE DRAWING

These and other objects, features and advantages of the present invention will become more apparent from the following description when taken in conjunction with the accompanying drawing which shows, for purposes of illustration only, two embodiments in accordance with the present invention, and wherein:

FIG. 1 is an exploded view of the two-partite nipple-sleeve tube connection in accordance with the present invention;

FIG. 2 is a plan view in the axial direction on the sleeve member taken in the direction of arrows 2—2 of FIG. 1;

FIG. 3A is a cross-sectional view, taken along line 3—3 of FIG. 1 and illustrating the nipple-sleeve tube connection in accordance with the present invention in the position in which the hose is mounted over the nipple-receiving portion with the sleeve member in the retracted, disengaged position;

FIG. 7 is a partial cross-sectional view, illustrating a modified embodiment of a nipple structure with an internal threaded connecting portion for connection with an externally threaded member;

DETAILED DESCRIPTION OF THE DRAWING

Figure 3B:
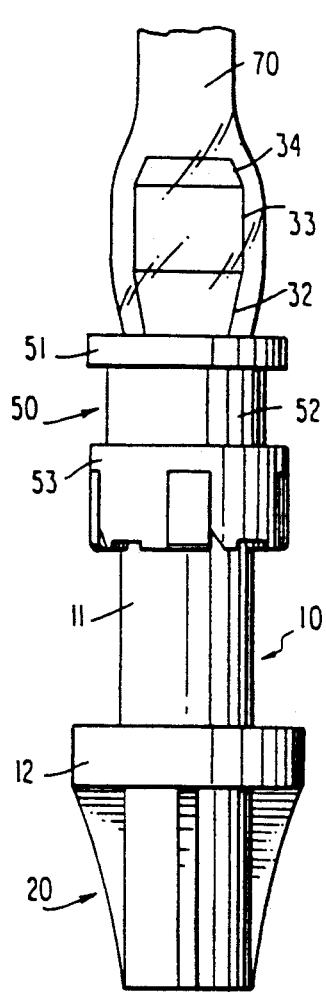
FIG. 3B is an elevational view, illustrating the parts of the nipple-sleeve tube connection in their position shown in FIG. 3A.

Referring now to the drawing wherein like reference numerals are used throughout the various views and more particularly to FIGS. 1-6, reference numeral 10 generally designates a nipple structure which includes at one end a connecting portion generally designated by reference numeral 20 and at the opposite end a tube-receiving nipple portion generally designated by reference numeral 30. Intermediate the connecting portion 20 and the tube-receiving portion 30 the nipple structure 10 includes a cylindrical main portion 11, which is continued as cylindrical portion 21 on the other side of the annular portion 12. An internal bore 13 extends from the free end of the tube-receiving portion 30 into the connection portion 20 where it is adjoined by the larger bore portion 22 which terminates in an outwardly flaring portion 23. To permit a press-in connection of the connecting portion 20 onto the part with which it is to be detachably connected, fin-like members 25 extend radially from the cylindrical portion 21, preferably uniformly spaced over the circumference of the cylindrical portion 21. The fin-like members 25 are provided radially outwardly with curvilinear tapering surfaces 25' as best shown in FIGS. 3A and 4A. At the end opposite the annular member 12, the main nipple portion 11 is provided with a collar 15 forming an axial abutment surface 15' (FIG. 1) facing the tube-receiving nipple portion 30. The annular collar 15 is additionally provided with a number of radially outwardly projecting, circumferentially equally spaced locking members 16, which leave therebetween recesses 17 for engagement by complementary parts of the sleeve-like member generally designated by reference numeral 50 as will be described more fully hereinafter.

The tube-receiving nipple portion 30 includes a first section 31 of cylindrical configuration adjoined by a second section 32 of outwardly flaring external configuration which is followed by a third section 33 of cylindrical configuration, terminating in a fourth section 34 of tapering configuration. The internal bore 13 thereby extends uniformly through the entire tube-receiving nipple portion 30 and main portion 11 up to the enlarged bore portion 22. The minimum diameter of the tapering end section 34 which corresponds at least approximately to the outside diametric dimensions of the first nipple section 31, serves as guide surface for the tube 70 and assists in expanding the latter as it is slipped over the tube-receiving nipple portion 30. However, the minimum diametric dimension of the tapering fourth section 34 may also be slightly larger than the outside diametric dimension of the first section 31. The external diametric dimension of the first section 31 of cylindrical shape is thereby of at least approximately the same diametric dimension as the internal diametric dimension 71 of the tube 70. The external diametric dimension of the third nipple section 33 which is larger than that of the first nipple section 31, is thereby so chosen that the tube will slip over the same after expansion by way of the tapering portion 34.

The sleeve member 50 is a one-piece element provided with an annular flange 51 followed by an externally cylindrical section 52 which is then adjoined by a cylindrical locking section 53 of larger diametric dimension than the cylindrical section 52 and so constructed as to permit locking of the sleeve member 50 in its clamping position as will be described more fully hereinafter. Whereas the external configuration of the various parts 51, 52 and 53 of the sleeve member 50 are of essentially cylindrical configuration, its internal configuration consists of three sections; namely, a first section 54 of essentially constant internal diametric dimension, which starts in the cylindrical section 53 and which, in the direction toward the flange 51, is adjoined by a second outwardly flaring section 55 that terminates in a third outwardly flaring end section 56 whose taper is greater than that of the tapering section 55. The outwardly flaring section 55 thereby subtends an angle with respect to the axis of the sleeve member which is substantially the same as the angle of the second nipple section 32 with respect to the nipple axis so that these two surfaces are essentially parallel in the area of overlap.

Figure 4A:
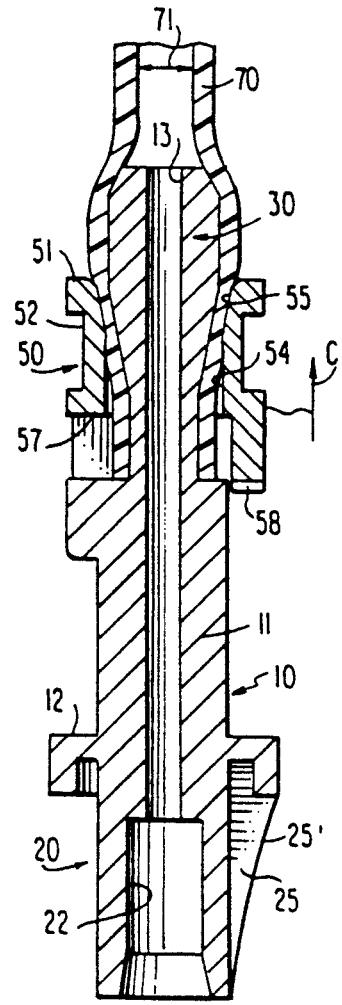
FIG. 4A is a cross-sectional view, similar to FIG. 3A, but illustrating the nipple-sleeve tube connection in the position of the various parts in which the tube is clamped fast by axial displacement of the sleeve member prior to its rotation into the locking position.
Figure 4B:
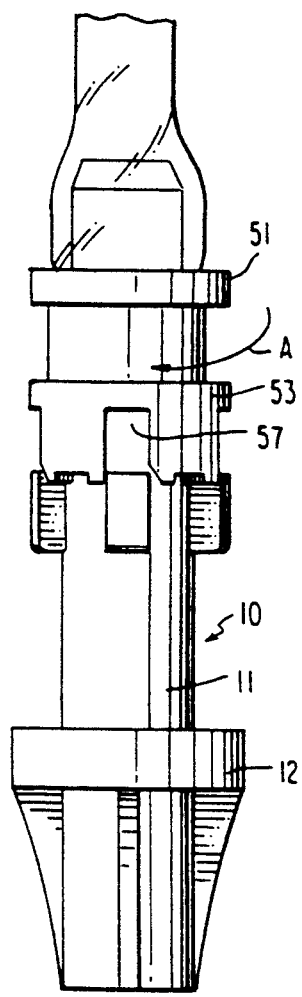
FIG. 4B is an elevational view, similar to FIG. 3B, illustrating the parts in their position shown in FIG. 4A.

The locking section 53 of the sleeve member 50 is provided with a number of axially extending recesses 57, equal in number to and spaced corresponding to the radially extending locking members 16. In the illustrated embodiment, four such locking members 16 and four corresponding recesses 57 are provided on the nipple structure 10 and in the sleeve member 50, respectively. The axial depth of the recesses 57 is thereby such that the sleeve member 50 can be moved into its retracted disengaged position illustrated in FIGS. 3A and 3B. The sleeve member 50 is additionally provided halfway between the recesses 57 with relatively very shallow notches 58 of a shape complementary to the external dimensions of the locking members 16 for determining the locked clamping position of the sleeve member 50 after rotation of the latter. To facilitate rotation of the sleeve member 50 from its disengaged, non-clamping position illustrated in FIGS. 3A and 3B into the clamping position illustrated in FIGS. 5 and 6, each recess 57 is provided with a bevelled or chamfered surface 57' on the side located in its trailing part, as viewed in the direction of rotation indicated by arrows A and A' in FIG. 4B and FIG. 5, respectively. The axial lengths of first nipple section 31 and of the first sleeve section 54 are thereby so correlated to the depth of recesses 57 that the bottom surface 59 of the sleeve member 50 is just about to clear the top surface of locking members 16 which is coplanar with abutment surface 15', as the sleeve member 50 is about to reach its clamping position (FIG. 4A).

Figure 5:
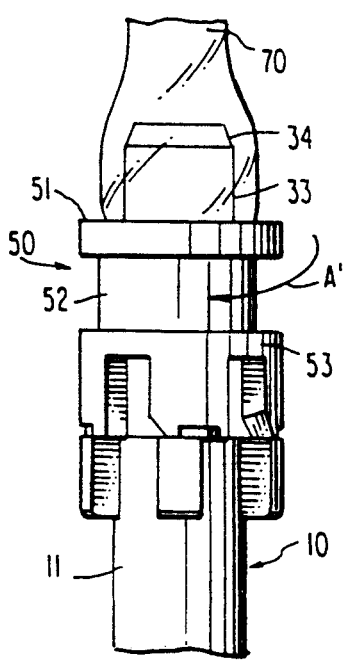
FIG. 5 is a partial elevational view, similar to FIG. 4B, illustrating the parts of the nipple-sleeve tube connection in accordance with the present invention after partial rotation of the sleeve-like member toward the locking position.
Figure 6:
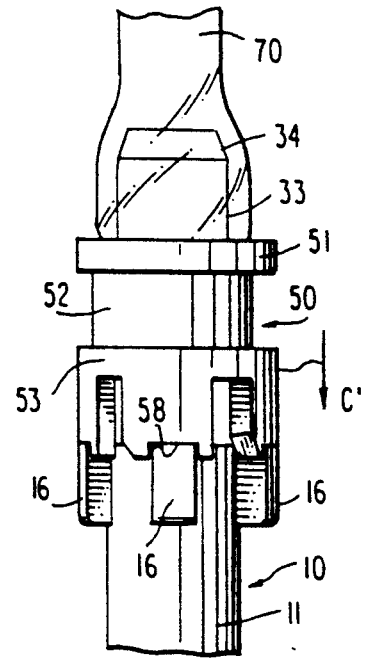
FIG. 6 is a partial elevational view, similar to FIG. 5, illustrating the parts after completion of rotation of the sleeve member and its engagement into the locking position.

To clamp a tube 70, the sleeve-like member 50 is first mounted over the tube-receiving nipple portion 30 of the nipple structure 10 whereby the internal dimensions of the cylindrical, second sleeve section 54 and the external dimensions of the cylindrical, third nipple section 33 are so chosen as to permit such assembly, i.e., the internal dimension of the cylindrical section 54 is only very slightly larger than the external diametric dimension of the cylindrical section 33. This slight difference in diametric dimensions, which is important in the present invention, is preferably of the order of 0.1 mm. A flexible tube, such as a silicon tube 70, is thereupon slipped over the tube-receiving nipple portion 30 in the direction of arrow B (FIG. 3A). With tubing material made from silicon which is flexible and stretchable, this poses no problem with proper choice of the dimensions of the various nipple sections 34, 33, 32 and 31. After the tube 70 cones into abutment at the axial abutment surface 15' of the annular collar 15, the sleeve member 50 is then moved from its non-clamping position in FIGS. 3A and 3B into clamping position (FIGS. 4A and 4B) by axial displacement in the direction of arrow C (FIG. 4A) whereby the flexible and stretchable tube 70 is now also strongly compressed. The sleeve member 50 is thereby axially displaced in the direction of arrow C until the end surfaces 59 of the cylindrical sleeve section 53 are slightly above the annular abutment surface 15' so that the sleeve member 50 can now be rotated in the direction of arrows A and A' shown in FIGS. 4A and 5 until notches 58 are aligned with locking members 16 whereupon the sleeve member 50 will be permitted to move a very slight distance in the direction of arrow C' as shown in FIG. 6, determined by the depth of notches 58, in which the sleeve member is in its locked clamping position. The movement in the direction C' is thereby assisted by the elastically compressed tube 70 in the area between the overlapping, outwardly flaring nipple section 32 and sleeve section 55. The very slight axial movement of sleeve member 50 in the direction of arrow C' (FIG. 6) does not affect the holding ability of the tube connection of this invention owing to the compressibility of tube 70 which in the position of sleeve member 50 in the position shown in FIG. 5 is slightly in excess of that required for reliable holding of the tube. Actual tests have indicated that a clamp in accordance with the present invention will satisfy the pull-off specification of three pounds over a two week period and a blow-out specification of 22 psi. Tests with the use of silicon tubing as used for IV feeding proved satisfactory at pressures up to 35 psi at which the tube burst while held fast in the clamped position obtained by the present invention.

As pointed out above, the inside diametric dimension of the cylindrical first section 54 of the sleeve member 50 is preferably about 0.1 mm. larger than the outside diameter of the third cylindrical nipple section 33, with an acceptable tolerance of +0.05 mm. in the dimensions of the inside diameter of the sleeve member section 54.

The absolute values for the diametric and axial length dimensions of the tube-receiving nipple portion 30 and of the sleeve member 50 are chosen depending on the tube size, its material and the thickness of the tubing. As these parameters vary, optimum diametric dimensions can be readily determined empirically as long as the dimensions follow the above indications.

In a typical example, with a silicon tube having an I.D. of 3.4 mm. and an O.D. of 4.9 mm., the first nipple section 31 has an O.D. of 3.5 mm. and the third nipple section 33 has an O.D. of 5.2 mm. while the first sleeve section 54 has an I.D. of 5.3 mm. +0.05 mm.

FIG. 7 illustrates a modified embodiment of a nipple structure 10 with a connecting portion generally designated by reference numeral 120 in which the enlarged internal bore 122 is provided with internal threads for connection with an externally threaded member. As to the rest, the tube connection is the same as that described in connection with FIGS. 1-6.

Figure 8:
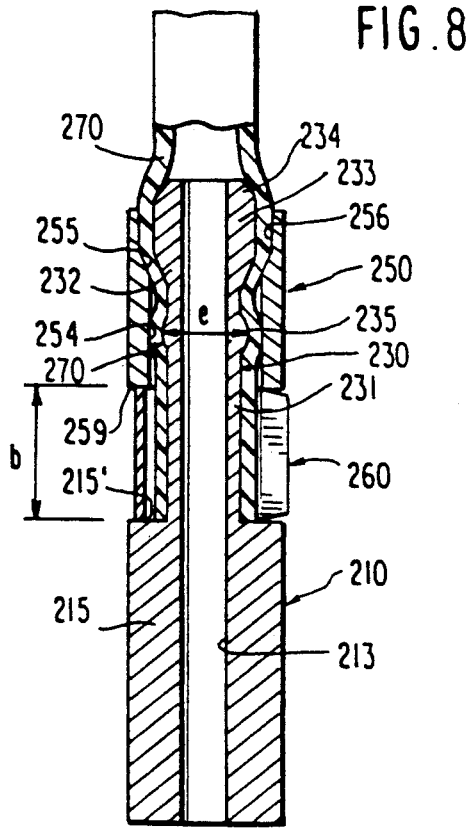
FIG. 8 is a cross-sectional view, similar to FIG. 4A of a modified embodiment of a three-partite nipple-sleeve tube connection in accordance with the present invention, illustrating the parts in the locking position.

FIG. 8 illustrates a further modified embodiment of a nipple-tube connection in accordance with the present invention which involves three separate parts, i.e., a nipple structure generally designated by reference numeral 210, a sleeve member generally designated by reference numeral 250 and a locking member generally designated by reference numeral 260 for displacing and retaining the sleeve member 250 in its locking position. For the sake of convenience, reference numerals of the 200 series are used in the embodiment of FIG. 8 to designate similar parts of the embodiments of FIGS. 1-6. The nipple structure 210 again includes a collar 215 forming an abutment surface 215'. In the direction toward its free end, the tube-receiving nipple portion 230 is provided with a first section 231 of cylindrical configuration adjoined by a second section 232 of outwardly flaring external configuration which is followed by a third section 233 of cylindrical configuration, which in turn may terminate in a fourth section 234 of tapering configuration. The internal bore 213 thereby extends uniformly through the entire tube-receiving nipple portion whereby the connecting portion (not shown) of the nipple structure 210 may be as shown in FIGS. 3A-4B or in FIG. 7. A bead-like enlargement 235 may be provided on the cylindrical first section 231 whose outside diameter e is such that the tube 270 is compressed in the illustrated clamping position of FIG. 8 to assist the holding action as described more fully hereinafter.

Figure 9:
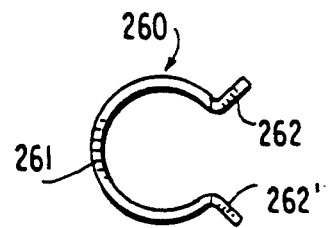
FIG. 9 is an axial elevational view of the metallic locking member used in the embodiment of FIG. 8.
Figure 10:
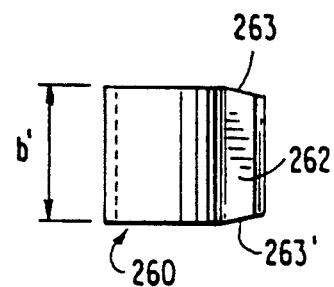
FIG. 10 is a top plan view of the locking member of FIG. 9.

The sleeve member generally designated by reference numeral 250 is a one-piece element which, for the sake of simplicity, is of externally cylindrical configuration though it may also have the external configuration of the sleeve 50 of the embodiment of FIGS. 1-6. The end face 259 of the sleeve member 250 is thereby planar, i.e., substantially parallel to the abutment surface 215'. The internal configuration of the sleeve member 250 again consists of three sections, namely, a first section 254 of essentially constant internal diametric dimension which is adjoined by a second outwardly flaring section 255 that terminates in a third end section 256 which may be substantially cylindrical or provided with an outwardly flaring portion near the outer end thereof. As shown in the embodiment of FIGS. 1-6, the outwardly flaring section 255 thereby subtends an angle with respect to the axis of the sleeve member which is substantially the same as the angle of the second nipple section 232 with respect to the nipple axis so that these two surfaces are essentially parallel in the area of overlap. The dimensional relationship of the tube-receiving nipple portion 230 and of the sleeve member 250 are substantially the same as those described in connection with the embodiment of FIGS. 1-6. Differing from the embodiment of FIGS. 1-6, locking of the sleeve member 250 in its clamping position is obtained by a separate locking member generally designated by reference numeral 260 which is adapted to be inserted into the axial space between the abutment surface 215' and the end face 259 after the sleeve member 250 has been displaced axially into a position at least approaching the clamping position. The locking member 260, as shown in FIGS. 9 and 10, is thereby of at least approximately part-circular configuration 261 as viewed in the axial direction and terminates in outwardly bent leg portions 262 and 262'. To facilitate insertion of the locking member into the space between abutment surface 215' and end face 259, the bent end portions 262 and 262' are bevelled off as shown in FIG. 10 at 263 and 263'. The axial length of the locking member 260 is thereby so chosen that it can be just wedged into the space between the abutment surface 215' and the end face 259 when the sleeve member 250 is in the clamping position, i.e., is of such length b' that it will just fit into the space of dimension b (FIG. 8).

Figure 11:
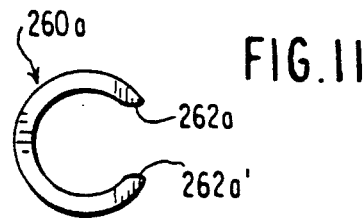
FIG. 11 is an axial elevational view of a locking member for use in the embodiment of FIG. 8 which is made of plastic material.
Figure 12:
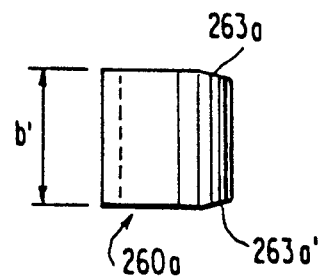
FIG. 12 is a top plan view of the locking member of FIG. 11.

Whereas FIGS. 9 and 10 illustrate a locking member made of spring steel, FIGS. 11 and 12 illustrate a locking member 260a made of suitable plastic material whereby the free ends are cut at an angle to form slanting surfaces 262a and 262'a while the lateral surfaces are bevelled at 263a and 263'a. If so desired, the cylindrical first section 231 of the tube-receiving nipple portion 230 may additionally be provided with an annular bead 235 which contributes to the retention of the tube 270 in the installed position, i.e., in abutment at the abutment surface 215'.

The embodiment of FIGS. 8-12 is operable to clamp the tube in the same manner as is realized in the embodiment of FIGS. 1-6 with the differences that rotation of the sleeve member 250 after axial displacement into the clamping position is no longer necessary as the locking action is now realized by the insertable separate locking member 260 or 260a. Though the embodiment of FIG. 8 requires three parts, it is more economic in manufacture and offers certain advantages in attaining clamping action and disconnection.

Figure 13:
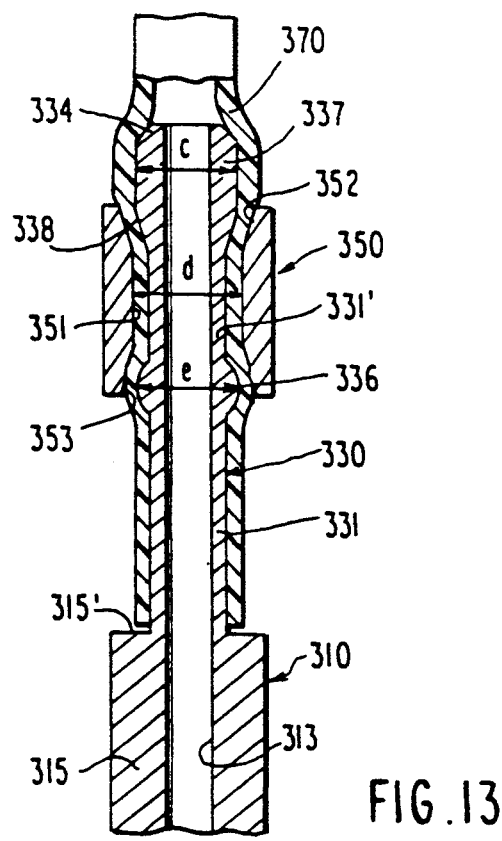
FIG. 13 is a cross-sectional view of still another modified embodiment of a two partite nipple-sleeve tube connection in accordance with the present invention, illustrating the parts thereof in the clamping position.

FIG. 13 represents a still further modified embodiment of a nipple-sleeve tube connection in accordance with the present invention which requires again only two parts and dispenses with any locking structure. It has been found surprisingly that an arrangement as disclosed in the prior U.S. Pat. No. 3,891,250 to Oetiker will also provide a reliable clamping action of small silicon tubes with certain modifications, necessary for proper operation of the connection. Reference numerals of the 300 series are used in FIG. 13 to designate parts corresponding to the tube connection of FIGS. 1-6. The nipple structure generally designated by reference numeral 310 is again provided with a through-bore 313 which extends from the free end of the tube-receiving nipple portion generally designated by reference numeral 330 through the nipple structure as shown in FIGS. 3A or 7. The nipple structure 310 again includes a collar or abutment 315 from which extends the tube-receiving nipple portion 330 as such. The latter consists of a first section 331, 331' of essentially cylindrical configuration, interrupted by an annular bead 336, forming a first enlarged nipple portion. The second enlarged nipple portion 337 near the free end of the tube-receiving nipple portion 330 which is of essentially cylindrical external configuration having a constant diameter is connected with the cylindrical section 331, 331' by way of outwardly flaring section 338 and terminates in tapering section 334.

The sleeve member generally designated by reference numeral 350 which is of externally cylindrical configuration has an essentially cylindrical internal bore 351 terminating in a bevelled surface 352 which subtends an angle with respect to the sleeve member axis similar to the angle subtended by the outwardly flaring connecting portion 338. Near its inner end, i.e., at the end nearer the collar 315, the sleeve member 350 may be provided also with a bevelled surface 353. The internal diametric dimension d of the sleeve member 350 is thereby slightly larger than the external diametric dimension c of the second enlarged cylindrical portion 337 of the tube-receiving nipple portion 330 so that the sleeve member 350 can pass over the second enlarged nipple portion 337 in the absence of the tube 370 but is precluded from doing so after the tube has been inserted over the tube-receiving nipple portion 330 after the sleeve member 350 has been displaced into its left-most position, i.e., in abutment at or near the abutment surface 315'. The maximum diametric dimension e of the first enlarged nipple portion 336 which is preferably a rounded-off annular bead, is thereby such that the cylindrical surface 351 of the sleeve member can just pass over the same in the presence of the tube 370 which is strongly compressed thereby. The external diametric dimension of the cylindrical section 331 is thereby preferably so chosen that the tube 370 is compressed between the external cylindrical surface 331' and the internal surface 351 when the sleeve member 350 is in its clamping position as shown in FIG. 13. This clamping position is attained as the sleeve member 350 has passed with its cylindrical surface 351 over the first annular enlarged portion 336 whereby a bevelled surface 353 assists in providing a locking action, so to speak of, to hold the sleeve member 350 in its clamping position.

To disconnect the tube, all that is necessary is to forcibly displace the sleeve member 350 toward the left as viewed in FIG. 13 until it is near to or abuts at the abutment surface 315' whereupon the tube 370 can again be removed. The sleeve-nipple-tube connection of FIG. 13 combines simplicity of structure with excellent clamping capability for small diameter tubes with which the present invention is concerned.

The various parts of the tube connections of the illustrated embodiments may be made of machined parts such as, for example, from stainless steel, aluminum or aluminum alloys, but are preferably made from plastic material such as PVC, utilizing conventional molding processes.

While we have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A tube connection, comprising a nipple structure and clamping sleeve means, said nipple structure including at one end a connecting portion and at the other end a tube-receiving portion, said tube-receiving portion having an axial abutment surface means and several tube-receiving sections including in a direction toward the free end of the tube-receiving portion a first substantially cylindrical section having an external diametric dimension corresponding at least approximately to the internal diametric dimension of a tube to be connected and a second, outwardly flaring clamping surface of increasing diametric dimension in the direction of the free end of the tube-receiving portion, the sleeve means having a first section with an internal diametric dimension slightly greater than the maximum diametric dimension defined by said flaring clamping surface of the tube-receiving nipple portion so that the sleeve means can be slipped over the tube-receiving nipple portion, said sleeve means including a second section with an outwardly flaring clamping surface whose internal dimensions increase from the internal diametric dimension of the sleeve first section in a direction toward the free end of the tube-receiving nipple portion so that a tube mounted over the tube-receiving nipple portion is adapted to be compressed and clamped fast between the two outwardly flaring surfaces as the sleeve means is axially displaced in the direction toward the free end of the tube-receiving nipple portion from its non-clamping position into its clamping position, and further means for holding said sleeve means in its clamping position relative to said tube-receiving nipple portion after substantially only axial displacement of the sleeve means.

2. A tube connection according to claim 1, wherein said further means includes complementary locking means on said nipple structure in the area adjacent the tube-receiving nipple portion and on said sleeve-like means in the area opposite the free end of the tube-receiving nipple portion to enable locking of the sleeve means in the clamping position by axial movement and subsequent rotation of the sleeve means.

3. A tube connection according to claim 2, wherein said complementary locking means includes recess means in said sleeve means, and locking members on the nipple structure intermediate its connecting portion and tube-receiving nipple portion, said recess means being open in the direction toward the locking members so as to enable axial movement of the sleeve means into its non-clamping position by engagement of the recess means with said locking members.

4. A tube connection according to claim 3, wherein notch means of relatively very shallow depth are provided intermediate the recess means in said sleeve means for engagement with said locking members upon axial movement of the sleeve means in a direction away from said locking members to clear the same and subsequent rotation for alignment of the notch means with said locking members.

5. A tube connection according to claim 4, further comprising bevelled surface means in the surfaces of the recess means as viewed in the trailing direction of rotation of the sleeve means into its locking position to facilitate such rotation.

6. A tube connection according to claim 5, wherein the outwardly flaring external surface of the tube-receiving nipple portion and the outwardly flaring internal surface of the sleeve means are of substantially complementary shape to define therebetween a space delimited by substantially parallel surfaces which is decreased by axial movement of the sleeve means away from the abutment surface means.

7. A tube connection according to claim 6, wherein said tube-receiving nipple portion includes a third section of substantially cylindrical shape which is adjoined by an inwardly tapering, fourth end section, and wherein the inside diametric dimension of the first section of the sleeve means is slightly larger than the external diametric dimensions of the third nipple section.

8. A tube connection according to claim 7, wherein the outwardly flaring second section of the tube-receiving nipple portion and the outwardly flaring second section of the sleeve means are of substantially complementary shape.

9. A tube connection according to claim 8, wherein the inside diametric dimension of the first section of the sleeve means is larger than the outside diametric dimension of the first nipple section by about 0.1 mm.

10. A tube connection according to claim 8, wherein said outwardly flaring second section of the tube-receiving nipple portion and said outwardly flaring second section of the sleeve means form an at least approximately identical angle with the adjacent cylindrical sections.

11. A tube connection according to claim 10, wherein said second outwardly flaring section of the sleeve means is followed by an outwardly flaring end section in the sleeve means forming an angle with the axis of the sleeve means greater than the angle formed by the second outwardly flaring section of the sleeve means.

12. A tube connection according to claim 6, wherein said connecting portion of the nipple structure forms a pressure-fit connection including an annular flange and a substantially cylindrical part extending from said flange, and generally radially outwardly directed fin members circumferentially spaced about the cylindrical section and having tapering surfaces tapering in the direction toward the free end of the connecting portion of the nipple structure.

13. A tube connection according to claim 6, wherein said nipple structure includes an internal through-bore which has a bore portion of larger internal diametric dimension in the connecting portion.

14. A tube connection according to claim 13, wherein the enlarged internal bore in the connecting portion of the nipple structure is provided with an internal threaded part.

15. A tube connection according to claim 6, wherein the tube to be connected is made from flexible, stretchable material of predetermined thickness and small external dimensions.

16. A tube connection according to claim 15, wherein said material is silicon.

17. A tube connection according to claim 1, wherein said tube-receiving nipple portion includes a third section of substantially cylindrical shape which is adjoined by an inwardly tapering fourth end section, and wherein the inside diametric dimension of the first section of the sleeve means is slightly larger than the external diametric dimension of the third nipple section.

18. A tube connection according to claim 17, wherein the outwardly flaring second nipple section and the outwardly flaring second sleeve section are of substantially complementary shape.

19. A tube connection according to claim 18, wherein said outwardly flaring second nipple section and said outwardly flaring second sleeve section form an at least approximately identical angle with the adjacent cylindrical sections.

20. A tube connection according to claim 19, wherein said second outwardly flaring section of the sleeve means is followed by an outwardly flaring end section in the sleeve means forming an angle with the axis of the sleeve means greater than the angle formed by the second outwardly flaring section of the sleeve means.

21. A tube connection according to claim 1, wherein said connecting portion of the nipple structure forms a pressure-fit connection including an annular flange and a substantially cylindrical part extending from said flange, and generally radially outwardly directed fin members circumferentially spaced about the cylindrical section and having tapering surfaces tapering in the direction toward the free end of the connecting portion of the nipple structure.

22. A tube connection according to claim 1, wherein said nipple structure includes an internal through-bore which is of larger internal diametric dimension in the connecting portion.

23. A tube connection according to claim 22, wherein the enlarged internal bore in the connecting portion of the nipple structure is provided with an internal threaded part.

24. A tube connection according to claim 1, wherein the tube to be connected is made from flexible, stretchable material of predetermined thickness and small external dimensions.

25. A tube connection according to claim 24, wherein said material is silicon.

26. A tube connection according to claim 1, further comprising locking means including a separate locking member adapted to be elastically inserted into the axial space between said axial abutment surface means and the end surface of the sleeve means nearer the abutment surface means.

27. A tube connection according to claim 26, wherein said separate locking member is made of elastic material and has an at least approximately part-circular shape as viewed in the axial direction for mounting over the first nipple section.

28. A tube connection according to claim 27, wherein said locking member is provided with bevelled surface means to facilitate insertion into the space between the abutment surface means and the sleeve means as the latter is being displaced into its clamping position.

29. A tube connection according to claim 1, wherein said further means includes a first enlargement on said first tube-receiving section of the tube-receiving portion, and wherein said second outwardly flaring section of the tube-receiving nipple portion which forms a clamping surface is adjoined by a second enlarged portion, the maximum external diametric dimension of the second enlarged portion being slightly smaller than the first section of the sleeve means so that the latter can pass over the second enlarged portion in the absence of a tube but is unable to pass over the same when the tube is mounted over the tube receiving nipple portion and said first enlargement being of such maximum diametric dimension that the first section of the sleeve means can just pass over the same in the presence of a tube which is compressed thereby.

30. A tube connection according to claim 29, wherein the sleeve means is provided with a bevelled surface near its end facing the free end of the tube-receiving nipple portion to provide a clamping action together with the second nipple section of the tube-receiving nipple portion when the sleeve means is in its clamping position.

31. A tube connection according to claim 30, wherein said last-mentioned bevelled surface is at least approximately parallel to the second section of the tube-receiving nipple portion.

32. A tube connection according to claim 30, wherein the sleeve means is provided with a bevelled surface near its end facing the abutment surface means to provide a locking action of the sleeve means in its clamping position as the first section of the sleeve means passes over the first enlarged portion.

33. A tube connection according to claim 32, wherein the maximum diameter of said first enlarged portion is such that the sleeve means can pass over the same in the presence of the tube by substantially compressing the latter.

34. A tube connection according to claim 33, wherein the first section of the sleeve means is of such internal diametric dimension in relation to the external diametric dimension of the first section of the tube-receiving sleeve portion that the tube is compressed thereby when the sleeve means is in the clamping position.

* * * * *